Patented June 19, 1934

1,963,818

UNITED STATES PATENT OFFICE 1,963,818

METHOD OF MAKING AN ADSORPTION AGENT

Leonard Kay Wright, Jackson Heights, N. Y.

No Drawing. Application September 7, 1927, Serial No. 218,114

3 Claims. (Cl. 252—2)

My invention relates to adsorption agents for refrigerating gases, and more particularly has reference to a method of preparing such adsorption agents.

My invention has peculiar utility in the adsorption of refrigerating gases in refrigerating and ice-making machines, but I do not limit it to the refrigerating art. Heretofore where a liquid absorption agent was used, many disadvantages attended the use of the liquid agents, such as providing traps and pumps to return the agent to the absorption chamber for use in the next absorption cycle. Solid adsorption agents have more or less rapidly deteriorated due to the continued adsorption and discharge of the refrigerating gases, and have tended to lose their efficiency after a continued period of use. Moreover, the presence of impurities in the refrigerating gases or the products of their distintegration, or both, caused the solid adsorption agents to lose their efficiency to an increasing extent with continued use.

The methods heretofore employed to secure an absorbent or adsorbent have necessitated expensive and intricate apparatus and the process as a whole has been extremely costly.

It was to overcome these disadvantages existing in the prior art and to achieve the other objects which will be apparent to those skilled in the art, that I have conceived this invention.

An object of my invention is to provide a solid adsorption agent for refrigerating gases which will not deteriorate through continued use, and which will not unduly lose its efficiency by reason of impurities or disintegration of the gases.

Another object of my invention is to devise an economical method of producing an adsorption agent having a high adsorptive capacity.

A further object of my invention is to devise a method of treating siliceous material to secure an efficient adsorbent.

A further object is to devise an inexpensive treatment of siliceous substances to secure an adsorbent whereby valuable by-products are obtained.

I have discovered that silica in some of its forms existing in the natural state acts as a very efficient adsorption agent for all gases. It has been customary heretofore to use a silica gel, but I have found that silica, itself, unadulterated, and uncombined, has properties which make it a far more desirable adsorption agent than any with which I have been heretofore acquainted. In particular I have found that where a natural substance exists having a silica skeleton, this silica skeleton is especially an excellent adsorbent of refrigerating gases.

The silica skeleton to which I refer will absorb all refrigerating gases. Among those gases which may be used with the silica skeleton are ammonia, methyl chloride, ethyl chloride, carbon dioxide, methylamine, propylamine, sulphur dioxide, methane, ethane, propane, chloroform, butane, or mixtures of these. But it is distinctly understood that I do not limit myself to these refrigerants, gases, or any combinations, of either or all of them.

In preparing my product for use in refrigerating apparatus, I preferably treat greensand with mineral acids, such as sulphuric acid. In this process the acid leach may be treated to recover by-products, such as potassium salts, iron and aluminum oxides, and fuming sulphuric acid. These substances obtained from the acid leach have considerable commercial value, and are easily and cheaply recoverable. The sale of these by-products materially decreases the cost of producing my adsorption agent.

The siliceous residue left as a result of treating greensand with sulphuric acid, is a product called glaucosil, and may be obtained as a by-product in the manufacture of potash and other materials from greensand. The substance glaucosil is the natural silica skeleton of the greensand and has apparently never been through the gel stage, unless perhaps it went through such a stage in former ages when the greensand from which it is derived was formed.

This natural silica thus obtained is highly activated, in fact to a much greater extent than is the case with any crystalline silica obtained by other methods. Glaucosil dissolves readily in dilute caustic by simply warming; acids apparently leave it unattacked, and it forms an adsorption agent for all gases of great efficiency.

In the manufacture of this product, after the treatment with mineral acid, such as sulphuric, the remaining product is thoroughly cleansed to remove from the surfaces of the silica skeleton all possible traces of the leached products and of the acids. This cleansing may be effected in several ways. The glaucosil may be cleansed with ether, or alcohol, or water, or carbon disulphide, or with combinations of these. One cleansing by detergents, or one washing with a cleanser may be sufficient, or it may be necessary to subject the glaucosil to several cleansing operations. Again, the actual cleansing may be followed by a heating stage to drive off the polluted cleanser, and the cleansing operation repeated. This alternate cleaning and heating may be continued until the glaucosil is sufficiently free from alien matter. It may be preferable for the heating stage to be carried out under pressure. Under certain conditions, and with certain cleansing agents, it may be desirable to place the glaucosil in a vacuum to insure that all of the cleansing material is removed from the interstices.

When the glaucosil has been freed of any or all such washing agents, detergents, or other cleansers, the porous mass in skeleton form then presents a tremendously large surface in comparison to its weight, and the clean surfaces appear to be activated to a large extent and the adsorption properties very great. In fact the adsorption of benzene, xylene, carbon tetrachloride and water by glaucosil is very much greater than for a proportionate weight of aluminum oxide or silica gel. The following table, giving the relative adsorptive capacity of glaucosil, aluminum oxide and silica gel, is quite informative:

*Adsorbed or absorbed*

| Adsorbent | Temperature C. | Benzene | Carbon tetrachloride |
|---|---|---|---|
| | | Percent | Percent |
| Glaucosil | 25 | 40.5 | 61 |
| Aluminum oxide | 20 | 16.0 | 29 |
| Silica-gel | 30 | 24.6 | 44.9 |

In practice, in employing glaucosil I find that it can be conveniently heated from 212 to 280° F. without losing any of its activity, or suffering any deterioration through continued heating and cooling cycles. In fact the heating of the material is not limited to itself but only to the critical temperature of the gas.

Through the use of glaucosil air cooling without the use of more expensive water cooling would be practical if the refrigerating gases used were any of the following: methyl chloride, ethyl chloride, methylamine, propylamine, sulphur dioxide, methane, ethane, chloroform, butane, or mixtures of these, but I do not limit myself to these refrigerants. Some of the other refrigerating gases would require water cooling and among these I list ammonia, carbon dioxide and propane. Water cooling of course can be eliminated even with these last mentioned gases if the condenser be made of a special design with cooling fins, or if it be equipped with fins and cooled by a forced draft.

It will be apparent from the foregoing that I have provided an adsorption agent for refrigerating gases possessing qualities that constitute distinct advances over the agents heretofore used. It will also be observed that the method herein described of securing glaucosil is simple, inexpensive, and results in the production of valuable by-products.

Where the word "adsorption", or any of its derivatives, appears in the specification or claims, it is to be taken as covering adsorption strictly speaking, absorption, or both adsorption and absorption. In the term "silica skeleton", the word skeleton is not to be construed as a limitation. With reference to the cleansing of the silica after recovery from the greensand, the word "cleansing" is to embrace either washing or deterging, or both.

While I have described a particular embodiment of my invention, it is my desire that I be limited only by the scope of the appended claims and the showing of the prior art.

I claim:

1. In a method of making a refrigerant adsorbent by treating a siliceous material to secure a silica skeleton, subjecting the skeleton to a cleansing agent comprising ether.

2. In a method of making an adsorbent by treating a siliceous material to secure a silica skeleton, cleansing the skeleton with a volatile organic solvent, and heating the skeleton under reduced pressure to evolve the volatile solvent and activate the siliceous skeleton.

3. A method of making a refrigeration adsorbent comprising leaching greensand with an acid to dissolve the acid soluble constituents and obtain a siliceous skeleton, and subjecting the skeleton to an organic solvent having a high affinity for water.

LEONARD KAY WRIGHT.